Jan. 9, 1940.  T. W. PAUL  2,186,306
TRACTOR
Filed Aug. 5, 1937  2 Sheets-Sheet 1

WITNESS
N. E. Kidder

INVENTOR
Talbert W. Paul
BY
ATTORNEYS

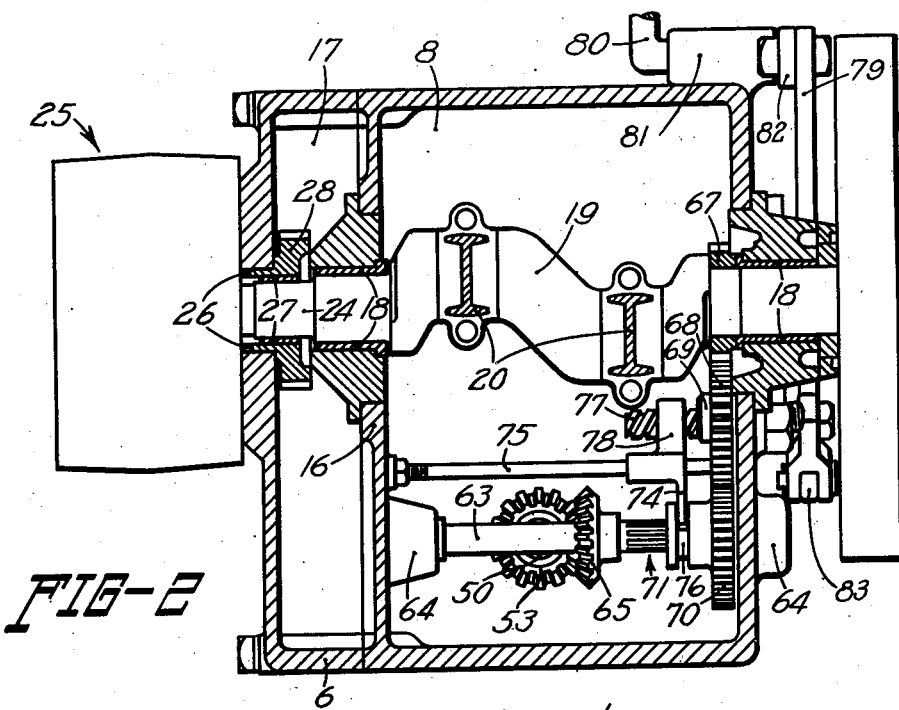

Patented Jan. 9, 1940

2,186,306

UNITED STATES PATENT OFFICE 2,186,306

TRACTOR

Talbert W. Paul, Moline, Ill., assignor to Deere & Company, Moline, Ill., a corporation of Illinois Application August 5, 1937, Serial No. 157,556

15 Claims. (Cl. 180—17)

The present invention relates to gear transmissions and more particularly to a reverse drive mechanism adapted for use in the transmission of an agricultural tractor.

Tractor transmissions have been designed to withstand the shocks and vibration of driving over rough, uneven ground without slipping out of gear, and as one gear setting is generally adequate for all field conditions on any given operation, it is seldom necessary to shift gears. Hence, ease of shifting has been sacrificed to a certain degree for ruggedness and a strong resistance to slipping out of gear.

Particularly objectionable is the effort and time consumed in shifting between forward and reverse gears where a considerable amount of jockeying back and forth is necessary. This is especially true when using a draft connection of the automatically disconnectable type or when push-type mowers or harvesters are mounted on the tractor frame. In the latter case, the tractor is backed up with sharply turned wheels at every turn in the field to get in position for the new direction of travel without missing any of the area otherwise missed because of the wide turning radius of the forwardly mounted implement.

The main object of the present invention, therefore, is to provide a power transmission mechanism in which the drive can be reversed in direction without shifting or otherwise disturbing the original setting of the forward drive gears.

Another object is to provide a direct drive to the bull gears on the driving wheel axles with independently operated clutches permitting application of power to either wheel while the other wheel is braked for sharp turning in reverse.

Still another object is to provide a transmission mechanism in which power for driving the tractor in reverse is derived from a power take-off shaft which is driven independently of the transmission clutch.

These and other objects and advantages of my invention will be apparent after a consideration of the following detailed description of a specific embodiment thereof, in which reference is made to the drawings appended hereto, in which Figure 1 is a sectional side view of a tractor transmission embodying the principles of my invention, taken along the line 1—1 of Figure 3.

Figure 2 is a sectional front view taken along the line 2—2 of Figure 1, of a portion of the same mechanism showing the driving connections between the motor crankshaft and the transmission mechanism.

Figure 3 is a sectional end view taken along the line 3—3 of Figure 1, showing the driving connection and clutch mechanisms for applying power to the rear wheels in reverse direction.

Figure 1:
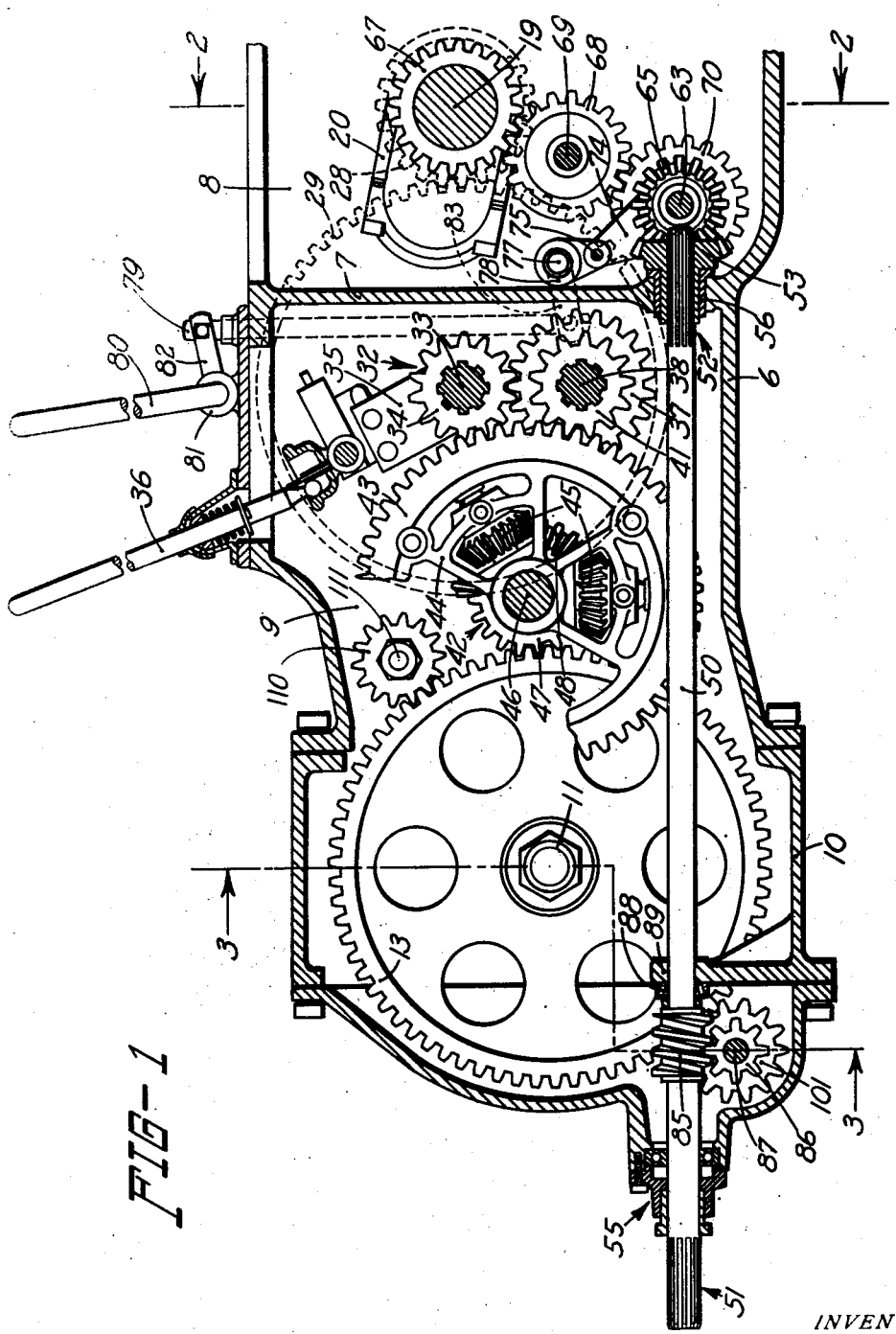

In the embodiment shown, I have illustrated my invention as applied to a modification of the transmission disclosed in Patent No. 2,103,543, granted December 28, 1937 to McCormick and Worthington. Reference is made to this application for details of the service transmission which are only sketchily described herein as they have no bearing on the present invention.

Referring now to the drawings, the mechanism is contained within a main housing 6 divided by a vertical, transverse wall 7 into a front crankshaft compartment 8 and a rear transmission compartment 9. Included in the rear transmission compartment is a transversely extending rear axle banjo housing 10, shown in detail in Figure 3, supporting a pair of laterally extending, co-axial driving wheel axles 11 on roller bearings 12. Rigidly mounted on the outer ends of the axles 11 are a pair of laterally spaced driving wheels (not shown). Primary driving members comprising a pair of laterally spaced bull gears 13 fixed to the inner ends of the axles transmit power from the transmission gears to the driving wheel axles 11.

The front crankshaft compartment 8 is divided longitudinally by a wall 16 defining the relatively narrow gear chamber 17 in which are carried the gears transmitting power from the front crankshaft compartment to the rear transmission compartment.

Power for driving the tractor is derived from a motor of which only the transversely extending crankshaft 19 and the bearing ends of the two laterally spaced connecting rods 20 are shown. The crankshaft 19 is journaled in the front crankshaft compartment 8 in suitable bearings 18, and one end 24 of the crankshaft projects through the gear wall 16 into the compartment 17 and through the side wall of the main housing 6 to drive the driving member (not shown) of an optionally disengageable clutch, indicated generally by the numeral 25. The driven member of the clutch 25 includes a sleeve 26 extending back into the gear compartment 17 over the crankshaft extension 24 and supported on it by a floating sleeve bearing 27, and is operatively connected to a pinion 28 meshing with the gear 29 to drive the main transmission driving member (not shown).

At this point reference is made to the before mentioned McCormick and Worthington patent, for details of the selective gear mechanism indicated generally by the numeral 32. Briefly, the mechanism comprises a series of optionally selective speed change gears transmitting power from the gear 29 to the bull gears 13 through a differential 42. The transversely extending splined driving shaft 33 on which are mounted a plurality of gears 34, is driven by the gear 29 through a two-speed driving connection (not shown). Connection between the driving shaft 33 and the differential 42 may be through the forward gears 37 which are fixedly mounted on the shaft 38 and include a pinion 41 in constant mesh with the differential ring gear 43, or in reverse by meshing a gear on the driving shaft 33 directly with the ring gear 43. Gears 34 are moved along the splined shaft 33 into mesh with either gears 37 or the differential ring gear 43 by means of a shifting fork 35 actuated by a shifting lever 36.

The differential itself comprises a spider frame 44 to which the ring gear 43 is fixed. A plurality of radially disposed beveled gears 45 journaled in the spider 44 mesh with a pair of laterally spaced bevel gears 48 fixed to the inner ends of a pair of transversely extending shafts 46. At their outer ends, the shafts 46 are connected with the bull gears 13 by means of pinion gears 47, completing the drive from the transmission to the rear wheels.

Coming now to that portion of the mechanism with which my invention is more directly concerned, a longitudinally extending power take-off shaft 50 is disposed beneath the center of the transmission and extends the length of the rear transmission compartment 9, said shaft projecting forwardly through the wall 7 into the crankshaft compartment 8, and rearwardly through the housing 10 out into the open for connection to implements adapted to be driven by a power take-off shaft. The rear end of the shaft 50 is provided with splines 51 for making a quick, positive coupling to the implements, while the front end of the shaft is likewise provided with splines 52 engaging a bevel gear 53, to hold the latter against rotation relative to the shaft 50.

At the point where the shaft 50 extends through the housing 10 at the rear, it is supported on bearings 55 which also seal the mechanism against dirt and prevent the lubricating oil normally carried in the housing, from leaking out. A bearing 56 in the wall 7 supports the shaft at its forward end and prevents any intermingling of the heavy grade oil carried in the transmission compartment with the lighter grade oil carried in the crankshaft compartment.

Whereas the conventional manner of driving the power take-off shaft is through the gears in the transmission, the present invention provides for a direct drive from the motor crankshaft through a train of gears, making the drive through the power take-off shaft independent of the clutch 25 with which the transmission is in serial connection.

Perpendicular to the power take-off shaft 50 at a point adjacent to its forward end, is a transversely disposed cross shaft 63 extending across the width of the crankshaft compartment 8 and journaled for rotation in a pair of laterally spaced bearings 64 housed in the wall 16 and the side of the housing 6. The extended center line of the power take-off shaft 50 intersects the center line of the cross shaft 63, forming a horizontal plane. A bevel gear 65, rigidly mounted on the cross shaft 63 for constant mesh with the bevel gear 53 on the power take-off shaft 50, provides an operative connection between the two shafts.

Power is transmitted from the crankshaft 19 to the cross shaft 63 by means of a train of gears comprising a pinion 67 fixedly mounted on the end of the crankshaft opposite the end carrying the clutch 25, meshing with an idler gear 68 rotatably mounted on a stud 69, which in turn engages a driven gear 70 slidably mounted on a splined portion 71 of the cross shaft 63.

The cross shaft 63 is disconnected from the motor by means of a shifting fork 74 which engages a groove 76 in the shifting gear 70 and shifts the latter into and out of engagement with gear 68. The shifting fork 74 is slidably mounted on a transversely extending rod 75. A helically threaded shaft 77 rotatably mounted on the housing wall 6 parallel to the rod 75 engages a mating threaded element 78 on the shifting fork 74 moving the latter along the rod 75 when the threaded shaft 77 is turned. The latter is rotated by a shifting bell crank lever 80 swingably mounted in a bearing 81 on the housing 6. The arm 82 of the bell crank lever is connected to an arm 83, which is fixed on the outer end of the shaft 77, by means of a vertically extending link 79.

At a point near the rear end of the power take-off shaft, the drive is applied to a cross shaft and through clutches to pinion gears in mesh with the bull gears 13, as will now be disclosed in detail.

Fixedly mounted on the power take-off shaft 50 is a worm 85 meshing with a worm gear 86 which is rigidly mounted on a secondary driving member comprising a transversely extending cross-shaft 87 disposed beneath the power take-off shaft 50. End thrust forces set up in the power take-off shaft by the worm gear drive are resisted by a thrust bearing 88 mounted on the power take-off shaft just ahead of the worm gear 85, and backed up by a vertically disposed supporting bracket 89.

The cross shaft 87 extends across the width of the banjo housing 10 and through the walls thereof. The two ends of the shaft 87 are provided with splined portions 95 on which are mounted the driving members 96 of clutches 97. Although single plate clutches have been indicated for the sake of simplicity, any suitable type of clutch could be employed.

Driven clutch members 98 are disposed in cooperative driving relation with respect to the driving members 96, and are slidably mounted on splined portions 99 of sleeves 100, respectively, which are disposed in coaxial arrangement with the shaft 87. Pinions 101 are fixedly mounted on each of the sleeves, respectively, at the opposite ends thereof to the clutch members 98 and are disposed in constant mesh with the bull gears 13, respectively. Each of the sleeves 100 is journaled in a bearing 102 mounted in the wall of the banjo housing 10 and supports the shaft 87 on a pair of laterally spaced floating sleeve bearings 103. A pair of individually operated forks 104 actuated by suitable levers or foot pedals (not shown), engage the grooves 105 in the driven clutch members 98, sliding the latter along the splined portions 99 of the sleeves 100 to engage or disengage the clutches 97 at the will of the operator.

To drive the tractor in reverse, the operator disengages the transmission clutch 25 and stops the tractor. Then he engages either or both of the clutches 97 depending on whether he wishes to back up in a straight line or turn. Engaging both clutches at the same time drives both of the wheels at the same speed in reverse, backing the tractor up in a straight line. A certain amount of slippage will take place in the clutches when the dirigible wheels are turned slightly, allowing one wheel to turn faster on wide turns.

To turn sharply to the right while backing up, the right wheel is braked, the dirigible wheels turned sharply to the right, and the left clutch engaged. The tractor will then pivot on the right wheel. The procedure is reversed for turning to the left. Braking is accomplished by means of one of a pair of conventional brakes which are connected respectively to the bull gears through pinions 110 fixedly mounted on the brake drum shafts 111 as is well known.

To revert to forward drive again, it is necessary only to disengage the reverse drive clutches 97 and engage the forward drive clutch 25. Not having shifted the transmission gears, the tractor is already in the same forward gear used prior to backing up.

What I claim as my invention is:

1. In a tractor having a pair of laterally spaced primary driving members, a clutch, and a selective speed transmission in serial connection for transmitting power from the tractor motor to said primary driving members to drive the latter in one direction, said transmission including means for transmitting power to either of said primary driving members separately, a secondary driving member connected with the tractor motor ahead of said clutch, and means including a pair of individually operated secondary clutches for optionally connecting said secondary driving member with either of said primary driving members to drive the latter in the opposite direction.

2. In a tractor, a pair of primary driving members, means for transmitting power from the tractor motor to said members including a clutch, selective speed transmission, and a differential in serial connection, a power take-off shaft connected with the tractor motor ahead of said clutch and adapted for connection with implements drawn by said tractor, and means for driving either of said primary driving members from said power take-off shaft, said means including a pair of independently operated secondary clutches, each of which is in serial engagement with one of said primary driving members.

3. In a motor driven vehicle the combination of a frame, a pair of driving axles journaled on said frame, a selective speed transmission consisting of a rotatable driving member operatively connected with the vehicle motor, a driven member operatively connected with each of said driving axles, gear means connecting said driving member with said driven members to drive the vehicle forwardly, and a clutch serially connected with said gear means, an auxiliary transmission for driving said vehicle in reverse comprising a drive shaft operatively connected with said driving member ahead of said clutch, second gear means connecting said drive shaft with said driven members, and clutch means disposed in serial connection with said second gear means for applying power to either of said driving axles at option.

4. In an engine driven tractor, a pair of driving wheel axles journaled on the tractor body, gear means connected with said axles including a selective speed transmission, a clutch connecting said gear means with the tractor engine, a secondary power transmitting mechanism comprising a power shaft connected with the tractor engine ahead of said clutch, and driving connection between said power shaft and said gear means including secondary clutch means serially connected therewith whereby power may be transmitted to either of said driving axles, at option.

5. In a motor driven vehicle, the combination of a pair of laterally extending driving wheel axles, a pair of laterally spaced bull gears fixedly mounted on the inner ends of the axles, a selective speed transmission comprising a driving member, a driven member operatively connected to said bull gears, gear means for transmitting the drive to said driven member at a plurality of optionally selective gear ratios, a clutch disposed in serial connection with said gear means, means for shifting said gears, and a secondary reverse transmission for driving said vehicle in reverse comprising a fore and aft extending drive shaft, means for operatively engaging the latter with said driving member, a pair of pinion gears disposed in constant mesh with said bull gears, respectively, gear means operatively connecting said drive shaft with said pair of pinion gears, and independent clutch means connected between each of said pinion gears and said last named gear means for driving said axles in reverse either independently or simultaneously, at option.

6. In a tractor having a pair of laterally extending driving axles, a selective speed transmission comprising a driving member operatively connected with the tractor engine and a driven member, gear means for transmitting the drive to said driven member at a plurality of optionally selective gear ratios, a clutch disposed in serial connection with said gear means, a pair of laterally spaced bull gears fixedly mounted on said driving axles, means for operatively connecting said driven member with said bull gears, a power take-off shaft operatively connected to said driving member independent of said clutch, gear means connecting said power take-off shaft with said bull gears for driving the tractor in reverse, and a pair of independently operable clutch means associated with said last named gear means for interrupting the drive from said power take-off shaft to either of said bull gears at option.

7. In a motor driven tractor, the combination of a pair of laterally extending coaxial driving axles, a pair of spaced bull gears fixedly mounted on the inner ends of said axles, a selective speed transmission comprising driving and driven members, and gear means for transmitting power from said driving member to said driven member at a plurality of optionally selective gear ratios, a clutch disposed in serial connection with said gear means, means for operatively connecting said driven member with said bull gears, a rearwardly extending power take-off shaft operatively connected to said driving member independent of said clutch, a transversely extending cross shaft operatively connected with said power take-off shaft, gear means engaging each of said bull gears for drive in reverse direction, and independently operated clutch means disposed in serial connection between said cross shaft and said last named gear means for driving said axles in reverse either independently or simultaneously, at option.

8. A tractor comprising a main housing divided into a front crankshaft compartment and a rear transmission compartment, a pair of driving wheel axles journaled in said rear transmission compartment, a pair of laterally spaced bull gears mounted on said axles to receive the drive, a transversely disposed crankshaft in the front compartment, a transmission driving gear supported for rotation in said rear transmission compartment, means for transmitting power from said crankshaft to said driving gear including a clutch, a driven member journaled in said transmission compartment and operatively connected to said bull gears, means for driving said driven member from said driving gear at different speeds and in reverse direction relative to the driving gear, a longitudinally disposed power take-off shaft extending from said front crankshaft compartment through said rear transmission compartment, means for transmitting power from said crankshaft to said power take-off shaft independent of said clutch, a transversely disposed cross shaft journaled for rotation in said rear transmission compartment and operatively connected with said power take-off shaft, a pair of pinion gears in constant mesh with said bull gears, and means for transmitting power from said cross shaft to said pinion gears for driving said bull gears in reverse direction, said last named means including independent clutches associated with each of said pinion gears for individual operation.

9. An engine driven tractor having a pair of driving axles, driving gears connected with each of said axles, respectively, and transmission means connecting the tractor engine with said driving gears for driving the axles forwardly, said transmission means including speed change gears and a clutch in serial arangement therewith, a power take-off shaft connected with the tractor engine head of said clutch and having a rearwardly extending portion adapted to be connected with implement attachments for driving the same, a transverse shaft having constant driving connection with said power take-off shaft, a pair of pinions in constant mesh with said driving gears, and means for operatively connecting either of said pinions with said transverse shaft to drive said axles in reverse.

10. A motor driven tractor having a frame, a pair of axles journaled on said frame, a driving gear fixed to the inner end of each of said axles, transmission means for driving said axles in one direction including a pinion meshed with each of said driving gears, clutch means disposed in serial connection between the tractor motor and said pinions, a second transmission connected with the tractor motor ahead of said clutch means for driving said axles in the other direction, said second transmission including a second pinion meshed with each of said driving gears, and secondary clutch means disposed in serial connection between the tractor motor and said second pinions.

11. A tractor having a frame, a pair of axles journaled on said frame, driving gears fixed to the adjacent ends of said axles, transmission means for driving said axles forwardly, including a pinion meshed with each of said driving gears, a clutch disposed in serial connection between the tractor motor and said pinions, a power take-off shaft operatively connected with the tractor motor ahead of said clutch, a second pinion meshed with each of said driving gears, and a clutch disposed in serial connection between said power take-off shaft and each of said second pinions for driving said axles in reverse.

12. In an agricultural tractor, the combination of a pair of driving axles, a pair of laterally spaced bull gears fixedly mounted on said axles, a selective speed transmission connecting the tractor motor with said bull gears for driving said axles forwardly, including a clutch in serial arrangement therewith, a relatively high speed power take-off shaft connected with the tractor motor ahead of said clutch and having means adapted for connection with implement attachments to drive the same, a transverse shaft, a worm fixed to said power take-off shaft and meshed with a worm gear fixed to said transverse shaft, and means for driving said bull gears from said transverse shaft, including independently operable clutch means disposed between said transverse shaft and each of said bull gears.

13. In an agricultural tractor, the combination of a pair of driving axles, a pair of laterally spaced bull gears fixedly mounted on said axles, a selective speed transmission connecting the tractor motor with said bull gears for driving said axles forwardly, including a clutch in serial arrangement therewith, a relatively high speed power take-off shaft operatively connected with the tractor motor and extending rearwardly therefrom, said power take-off shaft having means adapted for driving connection with implement attachments, a worm fixed to said power take-off shaft, a transverse shaft, a worm gear fixed to the transverse shaft in mesh with said worm, whereby said transverse shaft is driven from said power take-off shaft at a greatly reduced speed, a pair of pinions disposed coaxial with said transverse shaft and having constant driving connection with said bull gears, and a pair of independently operable clutches for connecting said pinions with said transverse shaft.

14. A tractor having a frame, a pair of axles journaled on said frame, a driving gear fixed to the inner end of each of said axles, a motor crankshaft, transmission means for driving said axles in one direction including a pinion meshed with each of said driving gears, clutch means disposed in serial connection between said crankshaft and said pinions, a second transmission connected to said crankshaft ahead of said clutch means for driving said axles in the other direction, said second transmission including a second pinion meshed with one of said driving gears, and secondary clutch means disposed in serial connection between said crankshaft and said second pinion.

15. A tractor having a frame, a pair of axles journaled on said frame, a driving gear fixed to the inner end of each of said axles, a motor crankshaft, transmission means for driving said axles forwardly, including a pinion meshed with each of said driving gears, a clutch disposed in serial connection between said crankshaft and said pinions, a power take-off shaft operatively connected with said crankshaft ahead of said clutch, a second pinion meshed with one of said driving gears, and a clutch disposed in serial connection between said power take-off shaft and said second pinion for driving said tractor in reverse.

TALBERT W. PAUL.

CERTIFICATE OF CORRECTION.

Patent No. 2,186,306. January 9, 1940.

TALBERT W. PAUL.

It is hereby certified that error appears in the printed specification of the above numbered patent requiring correction as follows: Page 1, second column, line 41, for "the gear wall 16 into the compartment" read the wall 16 into the gear compartment; page 4, first column, line 39, claim 9, for the word "head" read ahead; and that the said Letters Patent should be read with this correction therein that the same may conform to the record of the case in the Patent Office.

Signed and sealed this 20th day of February, A. D. 1940.

(Seal)

Henry Van Arsdale,
Acting Commissioner of Patents.